United States Patent Office 2,939,341
Patented June 7, 1960

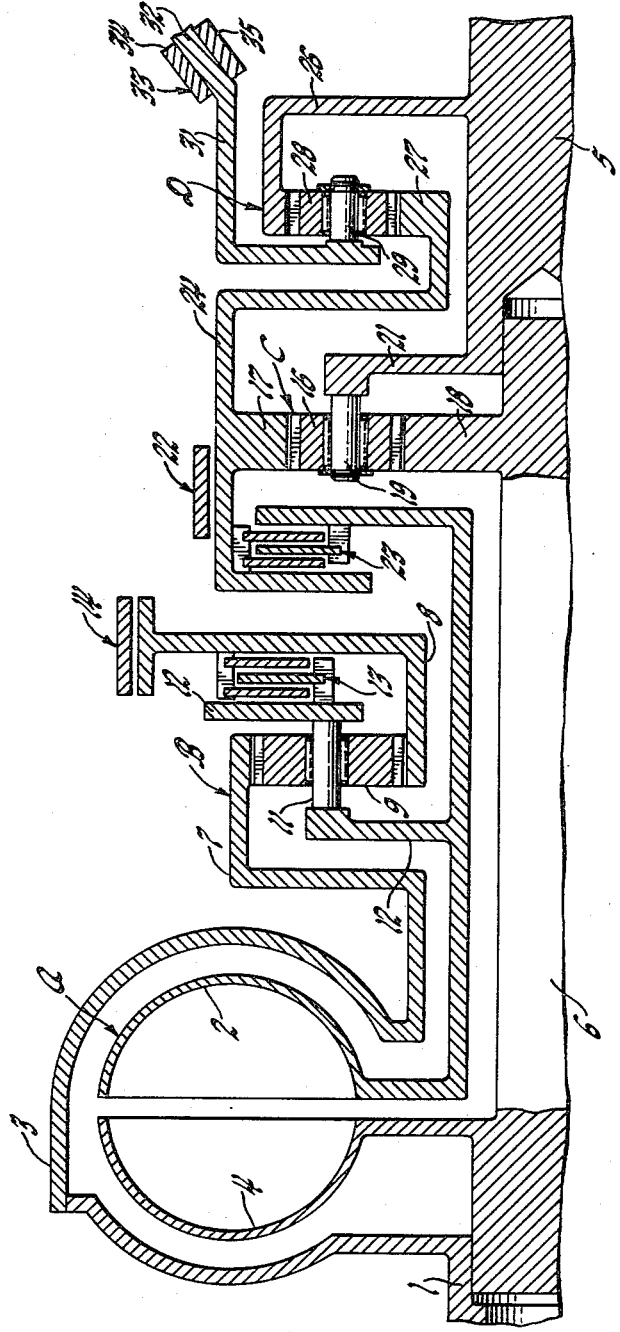

2,939,341

TRANSMISSION

Harold I. F. Evernden, Wistaston, England, assignor to General Motors Corporation, Detroit, Mich., a corporation of Delaware Filed Nov. 25, 1955, Ser. No. 549,112

Claims priority, application Great Britain Dec. 17, 1954

5 Claims. (Cl. 74—682)

This invention relates to transmissions, and particularly to planetary multiple ratio transmissions for motor vehicles. It is an improvement of a transmission shown in British Patent 716,170, the disclosure of which is incorporated herein by reference.

In general, the drive ratios of the conventional three or four speed passenger vehicle transmission have been found inadequate for certain uses, e.g., some commercial vehicles. These commercial vehicles, in performing a specific task, require additional drive ratios, both for convenience and more efficient performance. To achieve this desired result, there is a problem of either revising a conventional transmission or providing a completely new one. In a situation where a passenger type transmission could be utilized, except for the lack of an adequate number of ratios, it would necessarily be expensive, considering design and development in addition to other factors, and therefore objectionable to be required to provide a totally new transmission.

The present invention contemplates solving this problem by supplementing the planetary gearing of one form of conventional four speed transmission in a novel manner to obtain additional forward speeds with a minimum of extra structure. In obtaining increased ratio coverage, certain gearing arrangements are employed to advantage in rendering the transmission both more efficient and versatile for either automatic or manual manipulation. For example, torque is divided through a fluid coupling to lessen fluid losses and the reactive force of one of the members of a planetary gear set is utilized to add forward driving torque to the output shaft.

Other objects and advantages of the invention will be more apparent from the following description and the accompanying drawing, in which the single figure is a longitudinal symmetrical section of a six speed transmission.

In the drawing, three compounded planetary gear sets B, C and D and a fluid coupling A are shown operatively connected between an input shaft 1 and an output shaft 5.

The fluid coupling A includes an impeller 2, a turbine 4, and a torus shell 3. The torus shell 3 is driven by an input shaft 1, attached to a prime mover in any desired manner, and drives the input ring gear 7 of the planetary gear set B. A fluid coupling output shaft 6 is driven by the turbine 4, while the impeller 2 is operatively connected to a carrier 12.

The planetary gear set B, comprising a ring gear 7, a reaction sun gear 8 and a plurality of planet pinions 9, rotatably mounted on a shaft 11 of the carrierrier 12, is controlled by any suitable clutch 13 and any suitable brake 14. Clutch 13 coacts between the sun gear 8 and the carrier 12 so that, when engaged, a direct drive through the gear set is provided. The reduced speed drive results when the sun gear 8 is held by the brake 14.

Spaced from and coaxial with the first planetary gear set B, a second planetary gear set is mounted having a plurality of pinions 16 intermeshing with a ring gear 17 and a sun gear 18, driven by fluid coupling output shaft 6. The pinions 16 are positioned on a shaft 19 of a carrier 21, integral with the output shaft 5.

A brake 22 and a clutch 23, both of any suitable construction, alternately cooperate with gear set C to provide two drive ratios. When the clutch 23 is engaged, assuming that clutch 13 is engaged, a direct drive is effected by causing the ring gear 17 to rotate at engine speed, while the sun gear 18 rotates approximately at engine speed, the difference being the slip of the fluid coupling A. Brake 22 holds the ring gear 17 for the other of the two ratios.

Behind the second planetary gear set C, an interconnecting member 24 operatively joins the ring gear 17 and a sun gear 27 of a third planetary gear set D. Gear set D includes, in addition to the sun gear 27, a ring gear 26 connected to the output shaft 5 and a plurality of planet pinions 28 intermeshing with the sun gear 27 and the ring gear 26. The planet pinions 28 are rotatably mounted on a shaft 29, connected to a carrier 31. The carrier 31 may be held, when desired, by any suitable brake 33 having a fixed portion 34 and any suitably operated piston 35, for example, a hydraulically operated piston, both the portion 34 and the piston 35 coacting with a conical flange portion 32.

The output shaft 5 drives the vehicle wheels or any other driven means associated with the transmission.

In operation, torque, is transmitted by the input shaft 1, through the torus shell 3 and the ring gear 7 to gear set B. From this point, torque is transferred by the carrier 12 at either reduced speed or direct drive, depending on whether the clutch 13 or the brake 14 is engaged, to the fluid coupling A and the clutch 23. If the clutch 23 is engaged, then both the ring gear 17 and the sun gear 18 wil become input gears for the gear set C and rotate at substantially the same speed, the difference in speeds being caused only by fluid coupling slip. For the same reason, the shafts 5 and 6 will rotate at nearly the same speeds.

The gear set C also provides a reduced speed, with the clutch 23 disengaged and with the band 22 engaged to hold the ring gear 17. Whenever the gear set D is used to obtain extra ratios the ring gear 17 must be free to be driven solely by the gun gear 18 through planet pinions 16. Consequently, gear set D can only be used when band 22 and clutch 23 are released. This restricts to two the ratios with which gear set D can be employed to provide further reduction. Under these conditions, gear set D provides a reduced speed drive from whichever speed ratio is provided by gear set B and supplied to input sun gear 18. This is effected as follows:

Assuming the car to be as rest, the output shaft 5 initially tends to hold the carrier 21 stationary, so that sun gear 18 drives the ring gear 17 and the sun gear 27 backwards at a reduced speed ratio, determined by the ratio of the number of teeth on sun gear 18 to the number of teeth on ring gear 17. Because brake 33 is set, the carrier 31 is held and the sun gear 27 through pinions 28 drives forward the ring gear 26 and the output shaft 5 at a further reduced ratio. This ratio tends to be that of the ratio of the number of teeth on sun gear 27 to the number of teeth on ring gear 26, at the instant motion begins. However, as soon as shaft 5 begins to turn forward, the carrier 21 is rotated forward. The carrier 21 is the reaction point of the rear set C. Although this forward rotation of the reaction point is in the direction which the carrier 21 tends to rotate due to the reaction beween pinions 16 and ring gear 17, it does not prevent drive from being imparted to ring gear 17 because the rate of forward rotation of the reaction point is limited by the ratio of the planetary gear set D to a value less than it would have if ring gear 17 was held. This forward motion of the carrier 21 causes the ring gear 17 to rotate at a speed less than it would otherwise be rotated by the sun gear 18 and so reduces the input speed of the ring gear 27, which in turn reduces the speed of the ring gear 26 (and output shaft 5) below the theoretical value at the instant motion begins.

A reversing gear box (not shown) may be provided of any known form for reversing the direction of drive from the output shaft 5.

The various speed ratios, obtainable through the transmission, are shown with the tabulation below. The relation of the units is merely illustrative since it is obvious that they may be altered, for example, second speed may become first speed simply by changing the gear ratios.

Speed Ratio:
- Neutral _____ All clutches and brakes disengaged.
- 1st speed _____ Brake 14 and brake 22.
- 2nd speed _____ Brake 14 and brake 33.
- 3rd speed _____ Clutch 13 and brake 22.
- 4th speed _____ Clutch 13 and brake 33.
- 5th speed _____ Brake 14 and clutch 23.
- 6th speed (direct) __ Clutch 13 and clutch 23.

I claim:

1. In a power transmission, in combination, a driving shaft for delivering a positive torque; a driven shaft; a fluid coupling including impeller and turbine elements; a first planetary gear unit having an input member connected to said driving shaft, a reaction member adapted to be held, an output member connected to said impeller, and a clutching means for locking together said reaction member and said output member; a second planetary gear unit including an input member connected to said turbine element, a reaction member adapted to be held or released to be driven and an output member connection to said driven shaft, a clutching means between said reaction member of said second planetary gear unit and said output member of said first planetary gear unit for dividing torque from said output member of first planetary gear unit; a third planetary gear unit including an input gear, a reaction planet carrier adapted to be held, an output gear connected to said driven shaft, a planet pinion journaled on said planet carrier in meshing relation with said input and output gears, and an interconnecting member for operatively joining said input member of said third planetary gear unit and said reaction member of said second planetary gear unit, both of said output members of said second and third planetary gear units delivering positive torque to said driven shaft.

2. A variable speed transmission comprising an input shaft; an output shaft; a fluid coupling including impeller and turbine elements; a first planetary gear set having a ring gear connected to said input shaft, a reaction sun gear adapted to be held, a planet carrier connected to said impeller element and planet pinions journaled on said carrier in meshing relation with said sun and ring gears; a second planetary gear set including a sun gear connected to said turbine element, a planet carrier connected to said output shaft, a ring gear adapted to be held or released to be driven and planet pinions journaled on said carrier in meshing relation with said sun and ring gears; a third planetary gear set having a sun gear connected to the ring gear of said second planetary gear set, a ring gear connected to said output shaft, a planet carrier adapted to be held and planet pinions journaled on said carrier in meshing relation with said sun and ring gears; and clutch means for locking up said first and second planetary gear sets.

3. A power transmission comprising a driving means for delivering a positive torque; a driven means; a fluid coupling including impeller and turbine elements; a first planetary gear set having an input member connected to said driving means, a reaction member adapted to be held, and an output member connected to said impeller element; a second planetary gear set including an input member connected to said turbine element, an output member connected to said driven means, a reaction member adapted to be held or released to be driven; a third planetary gear set having an input gear, a reaction planet carrier adapted to be held, an output gear connected to said driven means, and a planet pinion journaled on said carrier in meshing relation with said input and output gears; an interconnecting member for operatively joining said reaction member of said second planetary gear set with said input member of said third planetary gear set; and clutch means for locking up said first and second planetary gear sets, both of said output members of said second and third planetary gear sets delivering positive torque to said driven means.

4. In a power transmission, in combination, an input shaft; for delivering a positive torque; an output shaft; a fluid coupling including impeller and turbine elements; a first planetary gear set having a ring gear connected to said input shaft, a reaction sun gear adapted to be held, a planet carrier connected to said impeller element and planet pinions journaled on said planet carrier in meshing relation with said ring and sun gears; a clutching means coacting with said first planetary gear set for providing a direct drive therethrough; a second planetary gear set including a sun gear connected to said turbine element, a planet carrier connected to said output shaft, a reaction ring gear adapted to be held or released to be driven and planet pinions journaled on said planet carrier in meshing relation with said ring and sun gears; a clutch means between said reaction ring gear of said second planetary gear set and said planet carrier of said first planetary gear set adapted in the engaged position to provide a divided power path between said fluid coupling and said second planetary gear set; and a third planetary gear set having a sun gear connected to the ring gear of said second planetary gear set, a ring gear connected to said output shaft, a planet carrier adapted to be held, and planet pinions journaled on said planet carrier in meshing relation with said ring and sun gears said planet carrier of said second planetary gear set and said ring gear of said third planetary gear set both delivering a positive torque to said output shaft.

5. In a power transmission, in combination, a driving means for delivering a positive torque; a driven means, a hydrodynamic torque transmitting device, a first and second planetary gear unit, said first planetary gear unit including an output member and being adapted to transmit torque between said driving means and said output member both at a reduced speed forward drive ratio and a direct forward drive ratio, said output member delivering torque to both said hydrodynamic torque transmitting device and said second planetary gear unit, said second planetary gear unit adapted to operate both at a reduced speed forward drive ratio and a direct forward drive ratio and including operative connections for transferring torque from said hydrodynamic device and said first planetary gear unit to said driven means, a third planetary gear unit driven by said second planetary gear unit and adapted to coact therewith so as to deliver at a reduced speed forward drive ratio torque to said driven means, both said second and third planetary gear units delivering a positive torque to said driven means.

References Cited in the file of this patent
UNITED STATES PATENTS

| | | |
|---|---|---|
| 1,513,738 | Bomborn | Nov. 4, 1924 |
| 2,251,625 | Hale | Aug. 5, 1941 |
| 2,270,536 | Lenning | Jan. 20, 1942 |
| 2,645,135 | Frank | July 14, 1953 |